(12) United States Patent
Pressnell et al.

(10) Patent No.: US 11,653,075 B2
(45) Date of Patent: *May 16, 2023

(54) SUBSEQUENT LOOK MEDIA PRESENTATION ON A PLAYING DEVICE

(71) Applicant: Penthera Partners, Inc., New York, NY (US)

(72) Inventors: Joshua Pressnell, Spring Valley, OH (US); Scott Halpert, Santa Monica, CA (US); Brian Kline, New Providence, NJ (US)

(73) Assignee: PENTHERA PARTNERS, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/902,170

(22) Filed: Sep. 2, 2022

(65) Prior Publication Data

US 2023/0069253 A1 Mar. 2, 2023

Related U.S. Application Data

(63) Continuation of application No. 17/313,571, filed on May 6, 2021, now Pat. No. 11,438,675.

(51) Int. Cl.
*H04N 21/858* (2011.01)
*H04N 21/81* (2011.01)
(Continued)

(52) U.S. Cl.
CPC ... *H04N 21/8586* (2013.01); *H04N 21/23424* (2013.01); *H04N 21/4331* (2013.01); *H04N 21/812* (2013.01); *H04N 21/8456* (2013.01)

(58) Field of Classification Search
CPC ......... H04N 21/8586; H04N 21/23424; H04N 21/4331; H04N 21/812; H04N 21/8456;
(Continued)

(56) References Cited

U.S. PATENT DOCUMENTS

| 6,487,721 | B1 | 11/2002 | Safadi |
| 9,491,499 | B2 | 11/2016 | Wagenaar |

(Continued)

FOREIGN PATENT DOCUMENTS

CN    107864388    3/2018

OTHER PUBLICATIONS

R. Dubin, A. Dvir, O. Hadar, T. Frid and A. Vesker, "Novel ad insertion technique for MPEG-DASH," 2015 12th Annual IEEE Consumer Communications and Networking Conference (CCNC), 2015, pp. 582-587, doi: 10.1109/CCNC.2015.7158038 (Year: 2015).

(Continued)

*Primary Examiner* — Cynthia M Fogg
(74) *Attorney, Agent, or Firm* — Rothwell, Figg, Ernst & Manbeck, P.C.

(57) ABSTRACT

In general, in an aspect, second look advertising is enabled. During an original advertisement selection process at a network infrastructure, original-selection advertisements are selected for play back with a streaming format video on a viewer device. After the original advertisement selection process, the streaming format video is presented on the viewer device together with advertisements that are provided by a helper process and can include the original-selection advertisements or other advertisements or both.

22 Claims, 7 Drawing Sheets

(51) Int. Cl.
 *H04N 21/234* (2011.01)
 *H04N 21/433* (2011.01)
 *H04N 21/845* (2011.01)
(58) Field of Classification Search
 CPC ....... H04N 21/26258; H04N 21/23439; H04N 21/2668; H04N 21/44016; H04N 21/4542; G06Q 30/0273
 USPC .......................................................... 725/32
 See application file for complete search history.

(56) References Cited

U.S. PATENT DOCUMENTS

| | | | |
|---|---|---|---|
| 9,973,830 | B1 | 5/2018 | Shetty |
| 10,045,053 | B1 | 8/2018 | Wu |
| 2005/0193410 | A1 | 9/2005 | Eldering |
| 2009/0254437 | A1 | 10/2009 | Lee |
| 2014/0149210 | A1 | 5/2014 | Ma |
| 2015/0067722 | A1* | 3/2015 | Bjordammen .......... H04L 65/70 725/32 |
| 2015/0113089 | A1 | 4/2015 | Liu et al. |
| 2015/0325268 | A1 | 11/2015 | Berger |
| 2016/0112760 | A1 | 4/2016 | Kosseifi |
| 2016/0165319 | A1 | 6/2016 | Sun |
| 2016/0345074 | A1 | 11/2016 | Serbest |
| 2017/0070789 | A1 | 3/2017 | Liassides |
| 2017/0238068 | A1 | 8/2017 | Sellers |
| 2017/0310722 | A1 | 10/2017 | Chen |
| 2019/0313135 | A1 | 10/2019 | Pathak |
| 2020/0275148 | A1 | 8/2020 | Stockhammer |
| 2020/0304868 | A1 | 9/2020 | Ganjam |
| 2021/0168416 | A1 | 6/2021 | Weiner |
| 2022/0014292 | A1 | 1/2022 | Choi |

OTHER PUBLICATIONS

R. Seeliger, D. Silhavy and S. Arbanowski, "Dynamic ad-insertion and content orchestration workflows through manifest manipulation in HLS and MPEG-DASH," 2017 IEEE Conference on Communications and Network Security (CNS), 2017, pp. 450-455, doi: 10.1109/CNS.2017.8228708 (Year: 2017).

S. Pham, C. Krauss, D. Silhavy and S. Arbanowski, "Personalized dynamic ad insertion with MPEG DASH," 2016 Asia Pacific Conference on Multimedia and Broadcasting (APMediaCast), 2016, pp. 1-6, doi: 10.1109/APMediaCast.2016.7878162. (Year: 2016).
Developers.google.com [online], "Preloading Media", published on or before May 5, 2021, retrieved on May 5, 2021, retrieved from URL<https://developers.google.com/interactive-media-ads/docs/sdks/html5/client-side/preload>, 3 pages.
Headendinfo.com [online], "CSAI SSAI Client Side Ad Insertion Server Side Ad insertion", published on or before May 5, 2021, retrieved on May 5, 2021, retrieved from URL<https://headendinfo.com/csai-ssai/>,4 pages.
HLS Content Steering (v1.1b1) Preliminary Specification, published on or before May 5, 2021, retrieved on May 5, 2021, 5 pages.
medium.com [online], "Challenges with Server-Side Ad Insertion", Eyevinn Technology, published on Apr. 3, 2018, retrieved on May 5, 2021, retrieved from URL<https://medium.com/@eyevinntechnology/challenges-with-server-side-ad-insertion-85571f24aafb>, 5 pages.
Rayburn, "The Advantages of Handling Manifest Manipulation at the Network Edge to Personalize Video Experiences", Streaming Media Blog, Dec. 17, 2018, 6 pages.
Sewell, "Setver-side ad insertion and prefetch: monetising major OTT events", Videonet, published on Aug. 24, 2018, retrieved on May 5, 2021, retrieved from URL<https://www.v-net.tv/2018/08/24/ssai-and-prefetch-monetising-major-ott-events/>, 4 pages.
Stackpath.com [online], "What is Multi-CDN", published on or before May 5, 2021, retrieved on May 5, 2021, retrieved from URL<https://www.stackpath.com/edge-academy/what-is-multi-cdn/>, 3 pages.
Vijayanagar, "CSAI vs SSAI: Client Side Ad Insertion", OTTVERSE, published on Dec 7, 2020, retrieved on May 5, 2021, retrieved from URL<https://ottverse.com/csai-vs-ssai-client-side-server-side-ad-insertion/>, 13 pages.
Yospace.com [online], "Akamai, SpotX and Yosapce team up to go live with addressable advertising at scale", published on Sep. 20, 2018, retrieved on May 5, 2021, retrieved from URL<hitps://www.yospace.com/tag/prefetch/>, 3 pages.
Yospace.com [online], "Go Live", published on or before May 5, 2021, retrieved on May 5, 2021, retrieved from URL<https://www.yospace.com/home-page/insights/go-live/>.
International Search Report and Written Opinion issued in International Application No. PCT/US2022/27472 dated Sep. 2, 2022 (15 pages).

* cited by examiner

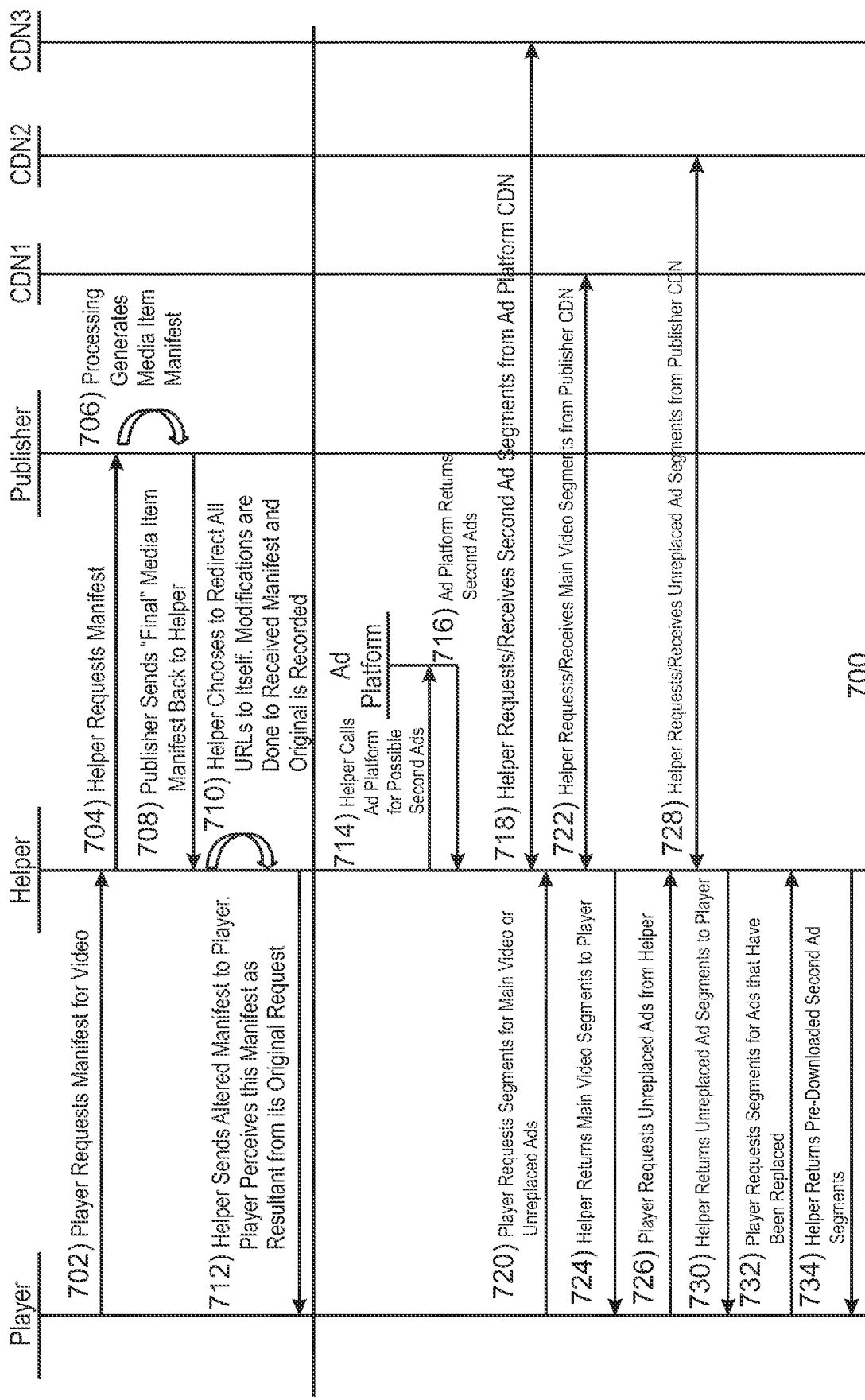

SUBSEQUENT LOOK MEDIA PRESENTATION ON A PLAYING DEVICE

CROSS-REFERENCE TO RELATED APPLICATION

This application is a continuation of U.S. application Ser. No. 17/313,571, filed on May 6, 2021 (status pending), which is incorporated by this reference.

BACKGROUND

This description relates to presenting media on a playing device.

A typical smartphone, digital video recorder (DVR), connected television (TV), or other playing device is designed to present media items, including audio items, video items, or other content received through a broadband network, a cellular telephone network, or another communication network. Media items to be presented to viewers can represent a wide variety of material including movies, pre-recorded television programs, and live programs such as sports or news, to name a few. The media items to be distributed are obtained from content sources (e.g., "origin servers"). These content sources may be managed by the content owners, such as suppliers of movies or TV shows and suppliers of advertisements ("ads") to be presented to viewers with the requested media items, or may be managed by distributors who have licensed the media items from the owners. Distributors, including but not limited to platform providers, can also obtain media items to be presented to viewers. The media items are typically distributed to the playing devices by one or more distribution servers, such as the servers comprising a content delivery network (CDN). We sometimes use the term CDN broadly to include, for example, any kind of distribution or other servers. We sometimes refer to all servers, systems, and network components that are involved in delivering content to a viewer as "the network."

Media items are typically embodied as a collection of small files, each file representing a brief segment in a sequence of segments that together make up the requested media item. Each of the small files is expressed according to a streaming format defined by a conventional streaming protocol and we sometimes call them "streaming-format files" or more simply "streaming files." Before a player presents a media item, it requests a manifest file (which we sometimes call simply a "manifest") from the network. Generally, the manifest file is human readable text and represents an ordered list of uniform resource locators (URLs) that point to, for example, segments of a media item that will be presented in sequence. In some cases, the URLs point to video segments and, in some cases, the URLs may point to audio segments or to text for closed captioning, and in some cases, the URLs may point to secondary manifest files. The player requests URLs from the primary and secondary manifests in the order they are listed in the manifest, to present the entire media item. The URLs in a manifest are kept in a precise order and conceptually we may consider them as representative of content at a numerical index.

In some cases, the manifest file may also include one or more references that point to advertisements selected for presentation to a specific viewer according to data known about that viewer. In many video streaming applications, the "effective" manifest presented to the player is created by a process, generally executed in the cloud, that involves altering an original manifest for the media items. When the player requests the original manifest from the publisher's servers, the publisher may invoke one or more internal or third party components that will insert, remove, or reorder the list of URLs in the original manifest, or which may add additional metadata to the manifest, to form the effective manifest, which in effect yields an altered media item to present for the user. For example, a multi-CDN implementation may alter the URLs in the original manifest to point to the same video located on different CDN systems. In another example, an advertising server may insert URLs for additional segments in the manifest that represent advertising. Particular manifest implementations are based on, at least in part, a type of streaming performed. In all cases, this entire process happens prior to the manifest being handed to the player.

Generally, the type of streaming associated with the transmission of media items varies according to a type of media items being transmitted to the viewer. Live streaming refers to transmitting in near-real-time media items that are captured in real time. For example, newscasts and live sporting events are typically presented to viewers as they are captured, as the newscast or live sporting event occurs. Media items delivered via live streaming typically have an unpredictable duration. Linear streaming refers to broadcasting canned media items according to a predetermined schedule. The media items are "canned" in that the substance of the media items and the duration of the media items are known and scheduled in advance, such as pre-recorded sitcoms, dramas, game shows, movies, and reality shows. All viewers of all playing devices are provided with the same media items at the same time in both linear streaming, such as at a time when the media items are scheduled to be available from a television channel. If the media item is missed, it cannot be watched at an unscheduled time using the linear stream. Put another way, linear streaming is scheduled and streamed according to the schedule. Video on demand (VOD) streaming presents viewers with a collection of media items and allows a viewer to select media items for presentation by a player without restriction. In VOD streaming, a viewer can request media items for presentation by the playing device at any time. The collection of media items refers to audio items, video items, or other content for which a corresponding content provider has produced or content in which the content provider has acquired streaming rights.

In the case of linear streaming, from the player's perspective, the manifest is dynamic and is re-requested at a configured interval so that the player can obtain the "next" content. However, the manifest is typically used to embody the information about a series of canned videos and advertisements necessary to present these items sequentially in a "stream". The individual content that makes up the stream is known ahead of time and has a fixed duration, but the manifest representing the stream itself is dynamic, allowing for schedule changes and interruptions within continuous ongoing programming. With linear streaming, the content may arrive at the player after a significant delay from its creation and assembly. Live streaming is a subset of linear streaming in which the content is presented as soon as it is created. The manifest is generated on the fly, driven by the course of events in the captured content, and has no pre-known duration or pre-known content. Put another way, the duration and substance of the content to be presented is inherently unknown. VOD, in contrast to linear streaming, presents individual canned videos and, optionally, advertisements by referencing an appropriate independent manifest for the sequence of segments that make up the video, representing a fixed number of segments with a known limited presentation duration.

In all kinds of video streaming, the sequence of segments presented to a viewer may include content segments and optional ad segments. Generally, content segments reference the requested media (e.g., video items, audio items, or any combinations thereof), and the ad segments reference advertising.

When streaming a canned video, arrangements are often made to accommodate advertisements to be inserted by publishers within the presented canned video. The placements are sold to the advertisers in what has become a high-value ecosystem. In particular, to fund the cost of creating content and delivering the content to playing devices for presentation to viewers, ads can be presented to the viewer before, during, or after presentation of a content. Ads are like media items in that they are embodied in streaming files that can be requested, stored by the playing device, and presented at appropriate times in conjunction with the media items, for example. (Sometimes when we use the term "media item" we are referring to the main content to be presented to viewers and also to the ads. Sometimes we are referring only to the main content.)

Two systems have been devised for placing ads in streaming videos as they are presented to a viewer by a player: client side ad insertion (CSAI) and server side ad insertion (SSAI, sometimes referred to as server side dynamic ad insertion (SSDAI)). The systems are implemented in view of the type of media transmission being performed (e.g., live streaming, linear streaming, or VOD streaming).

In CSAI, the manifest of the video indicates locations in the cloud where the player can find the content segments and can include ad markers. An ad marker is an indicator in the manifest that an ad segment should be inserted into the sequence of segments. This manifest is created and sent to the playing device. When the player reaches an ad marker in the manifest, a second player instantiation is created at the playing device to present the ad. The operation of CSAI implementations generally is not affected by differences between live streaming, linear streaming, and VOD streaming because all three approaches use ad markers and ad calls are made independently of the acquisition of the streaming content manifest. Generally, a call refers to accessing the location of a media item based on a pointer in the manifest to begin presentation of the media item.

In SSAI, the manifest that is created and sent to the player indicates the content segments and ad segments to be presented to a viewer. The sequence of segments is presented without the use of a second player instantiation. The operation of SSAI changes based on the type of streaming; live streaming, linear streaming, and VOD streaming advertising are handled in different ways. For SSAI operation with live streaming and linear streaming, the manifest is sent in successive parts to the player over time in a continuous stream with no known ending. As time progresses, the player will make repeated requests for the manifest and receive an updated manifest over time to allow continuous streaming. Because the manifest is sent over time in pieces, ads can be inserted at any point in time after presentation of content segments has started. In live streaming and linear streaming, when monetized by advertising, ad markers are placed in the manifest at predetermined points in time by the publisher, and indicate when and for how long an ad break will occur. An ad break generally refers to an interruption in streaming for the presentation of advertising segments. At some time near, but prior to each of these ad markers, the publisher's advertising infrastructure will be called upon to make decisions about what ads to place in the stream during these ad breaks. Often, these decisions can be made far enough in advance of the ad breaks for multiple ad requests and decisions to be made before URLs for a final set of ads are incorporated in the manifest and the corresponding ads are delivered to the player.

In VOD streaming, the manifest is created in response to a player requesting a video at a time prior to, but very near to, the delivery of the media items to the player and provides the player with information about the stream including its overall duration. The manifest has URLs that provide the location of each content segment corresponding to the requested video, and further includes URLs that provide locations for advertising segments. The particular ads to include in the manifest must be determined within a very short time before the manifest is delivered to the player, just prior to the presentation on the playing device to prevent long start-up delays observed by the viewer. The determination of an advertisement to be presented to a viewer is an ad decision. In VOD streaming, all of the ad decisions must be handled and "fully baked" prior to the delivery of the original manifest to the playing device. Because of the short time window available, these original manifests may include suboptimal mixes of advertisements.

Ad decisions can encompass choices about which ads should be used, how many ads should be used, and when the ads should be used for a given media item. Ad decisions are typically made by an advertisement infrastructure and are generally made by considering various factors including audience targeting data, the times when the ads are anticipated to be presented, the appropriateness of the ads, and others. Once the ad decisions are made, the selected ads are presented at the appropriate times during the presentation of the corresponding media item.

These decisions about which ads to insert are complex, but suffice it to say that everyone in the ecosystem knows that, for SSAI on VOD streaming, once the decisions are made and incorporated into the manifest that is sent to the player, they are essentially cast in concrete. The expectation is that the player will present the canned video segments in order and present the placed ads at the ad insertion points indicated in the manifest. Generally, players request video content and present segments as instructed by the manifest, assuming that the manifest is fixed upon the initiation of video playback. Publishers and advertisers make money based on ads presented during video playback.

For VOD streaming, in the haste of assembling the manifest at the last minute, it sometimes happens that duplicate ads are inserted, or ad insertion points must be left empty, or more generally that the inserted ads are not as valuable in the ecosystem as other ads might be.

SUMMARY

In general, in an aspect, during an original advertisement selection process at a network infrastructure, original-selection advertisements are selected for playback with a streaming format video on a viewer device. After the original advertisement selection process, the streaming format video is presented on the viewer device together with advertisements that are provided by a helper process and can include the original-selection advertisements or other advertisements or both.

These and other aspects, features, implementations, and advantages (a) can be expressed as methods, apparatus, systems, components, program products, business methods,

BRIEF DESCRIPTION OF THE DRAWINGS

FIG. 7 is another diagram illustrating communication between the player, helper, publisher, and one or more CDNs.

DETAILED DESCRIPTION

Introduction

Traditionally, in VOD streaming the URLs and the sequence of the URLs are fixed in manifests returned to a playing device in response to a request for media items when presentation of the media items begins. VOD streaming is often ad supported, meaning that advertisements are inserted throughout the presentation of content to generate revenue within the context of a digital advertising ecosystem. Note that although we generally refer to the manifest as containing URLs, in theory the manifest might contain other types of pointers expressed in other ways. We use the term "URLs" broadly to refer to literal URLs and also to any other kind of pointers that might serve a similar purpose or function similarly.

The technology that we describe here interrupts the traditional flow of requests made directly by the player to the cloud for segments based on the URLs in the cast-in-concrete manifest (e.g., the "original manifest"). The technology also interrupts the direct flow of the segments (including already-decided ads) back from the cloud to the player. Inserted in the interrupted traditional flow of requests is a helper that can make changes to the URLs for inserted ads in the theoretically cast-in-concrete manifest. In this way the helper intercepts the manifest sent by the publisher's video or ad infrastructure prior to playback of the content referred to in the manifest, generates an altered manifest and sends the altered manifest to the player instead of the original. The player (and the cloud infrastructure) need not be aware (and typically will not be aware) that they were provided an altered manifest containing revised URLs corresponding to updated ads. The player simply plays the segments received when it invokes the URLs of the altered manifest. And the cloud infrastructure simply provides URLs to newly decided ads for inclusion in the altered manifest. The helper sits between these two parties and manages the translation of requested URLs from the player based on the altered manifest to the location of the updated ads and content through various mechanisms such as normal HTML redirects. In some cases the helper could be co-located with the player on the playing device (or even be part of the player). In some examples the helper could be located in some other device on the client side. And in some instances, the helper could be located in the cloud to serve the player. In some cases, the extra time available to determine updated ads enables the selection of ads that generate more revenue when compared to the ads provided in the original manifest. Further, the technology enables a determination of missing ads at the start of content presentation, and can insert ads as needed. In this manner, the viewer does not experience extended wait times while ad decisions are made prior to content presentation and the updated ads are based on the latest information available to the helper.

Figure 1:
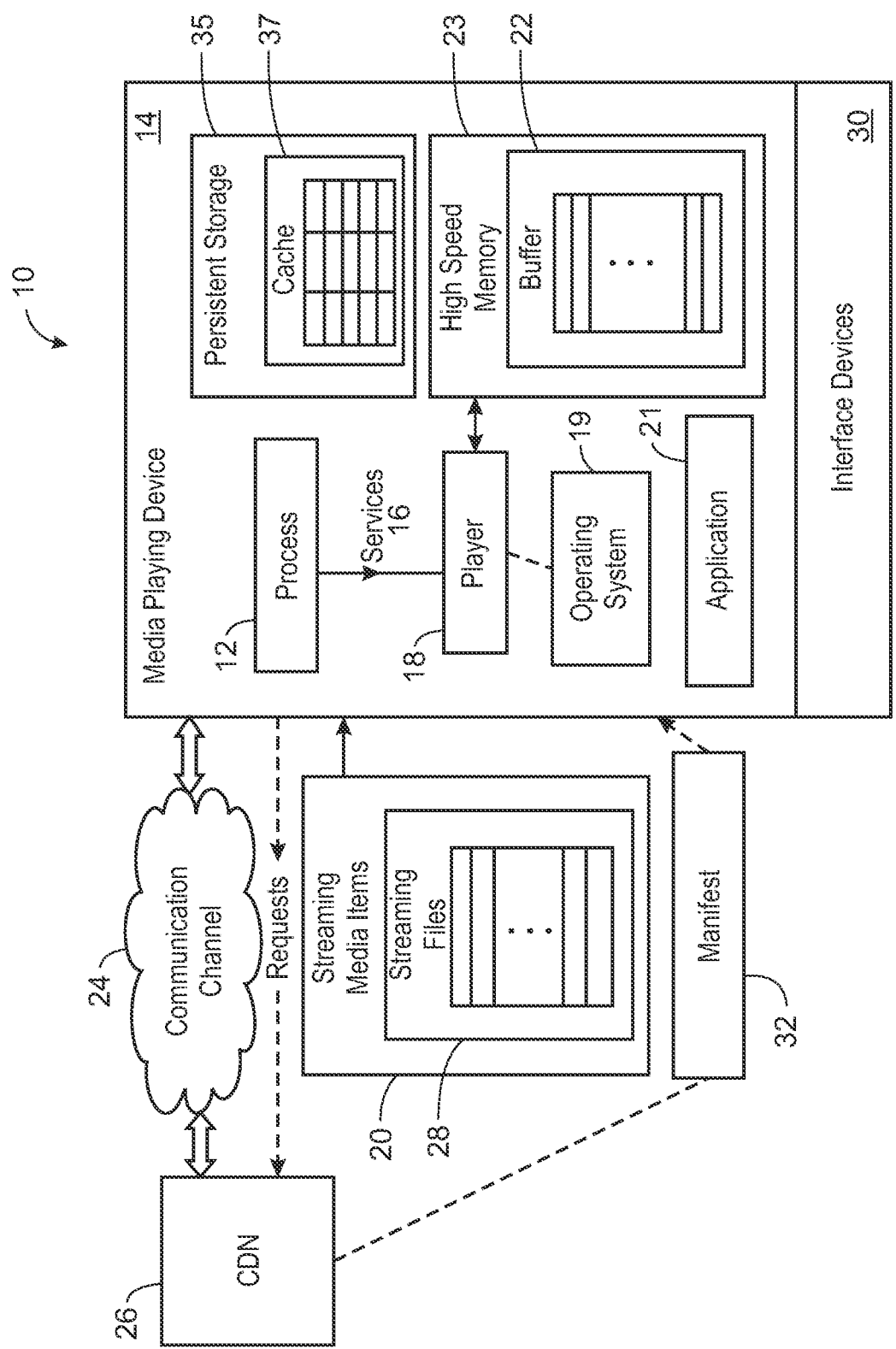
FIG. 1 an illustration of a technology that may be implemented, for example, as a process running on a playing device.

FIG. 1 is an illustration of a technology 10 that may be implemented, for example, as a process 12 (e.g., a helper) running on a playing device 14 and that provides services 16 to (e.g., helps) a player 18 that is also running on the playing device. Generally, the playing device 14 is a component that supports obtaining and presenting media items, either hardware, software, or any combinations thereof. For example, a component can be a process running on a processor, an object, an executable, a program, a function, a library, a subroutine, a processor, a system on chip, a computer, or a combination of software and hardware. In the example of FIG. 1, the playing device 14 includes an operating system 19 that controls and allocates resources of the playing device 14. Applications 21 include system applications that take advantage of the management of resources by the operating system 19 through software packages and data stored in persistent storage 35 (which includes a cache 37) or high speed memory 23 (which includes a buffer 22). For example, one or more software development kits (SDKs) can be used to implement the technology 10. The technology 10 can be implemented with various operating systems or combinations of operating systems.

We use the term "playing device" broadly to include, for example, any component, computer, mobile device, or other kind of equipment, or combinations of them, for presenting media items that have been or are being received, for example, from another device or another location. The playing device 14 of FIG. 1 is an example of a playing device. In some cases, the media item is a streaming media item and the media item is received through a communication channel of a communication network from a server as a sequence of streaming files. Playing devices can include smartphones, tablets, DVRs, set top boxes, computers, smart or connected TVs, game consoles (such as Xbox), streaming devices (such as Roku or Fire TV Stick) and personal assistant devices (such as Alexa) to name a few examples. A playing device can be implemented in a single physical device or in a combination of two or more cooperating physical devices. The player typically runs on the playing device, and the helper (described below) may reside in its entirety on the playing device or be resident in a different physical device in the same local network or reside entirely on a remote cloud based network.

We use the term "player" to broadly include any application, module, software, feature, operating system, or other process to process digital information (such as streaming files), that renders digital information in a presentable form as part of or all of media items. The player 18 of FIG. 1 is an example of a player. The player can present the rendered material to a viewer through displays, glasses, projectors, speakers, earphones or a wide variety of other interface devices 30 or combinations of interface devices. In some cases, a player provides no more than a minimal set of capabilities to present media items. In some cases, the player can include a more comprehensive set of features and functions or be embedded in or called from an application having a more comprehensive set of features and functions.

We use the term "media item" broadly to include, for example, any representation of audio, video, images, text, or other form of presentation (or combinations of them) of content. We sometimes use "media item" to refer to a form of presentation of content that is sequential over time, such as a movie, TV show, music, podcast, radio show, or advertisement, to name a few. In some cases, the sequential aspect of a media item is represented in a streaming format and the process of presenting the media item is known as "streaming." In some instances, the term "media item" includes an advertisement.

We use the term "advertisement" or "ad" to broadly include, for example, any representation of audio, video, images, text, or other form of presentation (or combinations of them) of content including a message associated with some form of sponsorship. In some cases, the advertisement is paid for (sponsored) by an advertiser that has an interest in or control over the message. In some cases the advertisement is used to promote the publisher (house ad) or a public service (public service announcement or PSA). The message is generally applicable to a broad audience and promotes a product, service, or idea. An "advertiser" refers to the source of the advertisement and the entity that funds the distribution of said advertisement through payments to publishers. Typically an advertiser is a company that is promoting a product or service within the advertisement as a mechanism to entice consumers to purchase that product or service. In this definition we also include any agency or representative of the end company referred to above as being an advertiser since these entities often produce the advertising creative and make decisions about what publishers will distribute said advertisements.

We use the term "publisher" to broadly include, for example, any entity that produces or distributes content and incorporates advertisements for presentation to viewers. The publisher can make revenue by placing (e.g., inserting) advertisements through a wide variety of media, including broadcast, streaming media, digital or print space, and combinations of them. In some examples, an advertiser may pay a publisher to place advertisements.

We use the term "platform provider" broadly to refer to companies or entities that provide distribution of applications over which users consume streaming content from various publishers. Examples of platform providers are Roku, Amazon, Apple TV, Google ChromeCast and others. Oftentimes, these platform providers operate their own content channels, such as Amazon Prime Video or AppleTV+ and can therefore be both a publisher and a platform provider. However, when referring to platform providers, we are speaking about them in their capacity as distributors of content and content applications for other publishers.

In some examples, the publisher is a place to present the advertiser's message, with an audience the advertiser is interested in converting, into some action, such as purchasing a product referenced in the advertisement. In some examples, an advertiser and a publisher are the same entity. For example, if a platform provider runs its own advertisements while also hosting advertisements, it is simultaneously an advertiser and a publisher.

We use the term "advertisement infrastructure" to broadly include, for example, resources used to purchase, select, sell, insert, and deliver advertising. For example, an "advertisement infrastructure" may be an "advertising platform" and may refer to ad insertion vendors, ad servers, demand-side platforms (DSPs), supply side platforms (SSPs), ad exchanges, or ad networks, each of which offers its own features. In some examples, an ad platform enables a publisher and an advertiser to view data on impressions and conversions. An impression refers to when an ad is viewed. Conversions refer to a metric that quantifies when a viewer initiates an action in response to an ad. In some examples, an ad platform tracks this data and provides it to the publisher and advertiser.

We use the term "ad exchange" to broadly include, for example, a platform that facilitates the buying and selling of advertising inventory among multiple advertisers and publishers. Advertising inventory refers to the ads placements that a publisher has available to sell to an advertiser. Prices of the ad placements are often determined through real-time bidding (RTB).

We use the term "ad pod" to broadly refer to, for example, a subset of the advertisements to be presented during an ad break while streaming a media item. The pod is presented to a viewer during an ad break and may be a subset of an advertising slate ("ad slate"). The ad slate generally refers to all ads identified by a manifest (e.g. manifest 32 shown in FIG. 1) to be presented at the appropriate time We use the term "demand-side platform" (DSP) to broadly include, for example, a platform that enables buyers of advertising inventory to manage multiple ad exchange and data exchange accounts through one interface.

We use the term "supply-side platform" (SSP) to broadly include, for example, a platform that enables publishers to manage their advertising inventory, fill it with ads, and receive revenue. Typically SSPs interact with DSPs that act on behalf of advertisers and their advertising agencies. This interaction is oftentimes, but not always based around the SSPs requesting bid offers or "bids" for inventory from the DSP. These bids then compete with each other to determine which advertiser is willing to pay the highest price for a particular ad placement. In some cases, the SSP makes inventory and data available to an exchange that includes a number of DSPs.

We use the term "communication channel" broadly to include, for example, any wired or wireless path, route, medium, or mechanism for carrying digital signals from one device or place to another. A communication channel can be implemented as part of a communication network and typically is bandwidth limited. The quality of a channel can vary slowly or rapidly and can depend on bandwidth and other characteristics.

We use the term "streaming file" broadly to include any digital representation of one or a series of two or more segments of a media item that is to be presented, for example, in sequence with one or more other streaming files as part of the continuous presentation of the media item. The streaming file can be expressed according to a standard protocol, such as a so-called streaming protocol or in another way, such as according to a non-standard protocol, or a defined approach other than a protocol.

The "value" of an advertisement can refer to the general worth of the advertisement to a publisher or an advertiser (or both) or to other parties when presented to a viewer. A high value advertisement can generate a higher amount of revenue for a publisher when compared to a low value advertisement.

Referring again to FIG. 1, the services 16 enable the player 18, among other things, to sometimes provide higher value advertisements while streaming media items 20 (which may comprise streaming files 28) than it would otherwise be able to do. The helper may evaluate the value of the original advertisements and use that value basis to request additional or new ads of higher value from the ad infrastructure. In this way, the helper is utilizing a novel approach to increasing the overall value of the advertising that will be delivered during a given playback session. Once advertisements are returned to the helper, the helper can decide which advertisements to insert. The higher value advertisements may be achieved for a variety of reasons including (a) advertisements selected based on data previously not available for consideration by the publisher and ad infrastructure, (b) advertisements selected due to indications in the system that greater timeouts during subsequent ad calls could yield preferable ad decisions, (c) advertisements selected due to the lack of a timely response by an ad server, (d) advertisements that should have been selected but where no advertisement was selected, (e) advertisements that have been selected based on a decision to increase the number of ads or ad pods in a stream beyond what was defined when the number of ad markers in the media item was originally determined, and (f) advertisements selected to replace one or more duplicated ads within an ad pod or multiple ad pods.

Generally, once a first ad decision is made and the player 18 begins presentation of the media items, the process 12 enables a subsequent, second, or additional period of time to make an updated decision about the advertisements to be presented to the viewer. The advertising selected by an initial decision is exchanged for advertising selected by an updated decision. For example, a media item is streamed to a player from a content service provider. One or more ad pods are scheduled for presentation during the presentation of the media item stream. During an ad break, ads are shown for one or more ad pods. The technology enables an updated decision for each ad of one or more ad pods after the initial presentation of the media item has started.

The ad placements within each pod are sold by the publisher or are allocated to and sold by another party such as a platform provider. Generally, an ad placement refers to an advertisement opportunity that can be bought and sold. The number of ad placements may be finite and subject to one or more constraints. In some cases, an advertiser purchases an ad placement. In some cases a platform provider sells an ad placement that it has been allocated. An unpaid advertisement filled by the publisher (a house ad) may contain a message from the publisher or a third-party. In some examples, a house ad is an advertisement for a product or service from the entity that has the allocation of the inventory. This could be the publisher, a platform provider, an advertisement for a public service (PSA) or other entity. In some examples, a house ad is an advertisement that is a placeholder for the publisher. In another example, a house ad could be an advertisement that is run on behalf of an advertiser that typically pays the publisher, but where the publisher is running the ad at no cost, such as, due to an error of under delivery from a prior paid campaign.

As generally discussed above, traditional VOD ad decisions are made within a short, constrained time window. For example, ad decisions are limited to a two to three second time window beginning when a request for ad-based streaming content is received from a player and the start of the presentation by the player of the streaming content. Within this short time period, each ad break may not be filled. As a result, one of two things tends to happen: (1) if an ad placement is available but does not get filled it will be filled with a house ad; (2) there might be no ad that is presented in the ad placement.

Among other things, the technology enables the use of decision making (e.g., decisioning) implemented or invoked by the helper to replace house ads or the lack of an advertisement with another ad, such as a paid ad or higher value ad. Accordingly, the technology enables elimination of a blank or truncated advertisement pod. Further, the technology enables adaptive ad pod durations, in which a determination on a final ad pod duration is made after streaming content is presented to a viewer. Additionally, the technology enables one or more additional ad pods to be inserted into the stream after streaming content is present to a viewer.

The Helper

The helper is, at least in part, a software component that is installed on a playing device, partly on a playing device and partly in the cloud, or entirely in the cloud, which could include a smartphone, a tablet, a laptop, a desktop, a connected television, or other streaming media device. In some implementations, the helper is installed on another device in the local network or on a remote network. Thus, the helper may be partially installed on a playing device and partially installed on another device.

The helper can be installed and run as a process on the playing device or an associated device or in the cloud. In some examples, the helper can serve the player and interact with a CDN 26 through a communication network (e.g., communication channel 24 of FIG. 1), generally without requiring changes to the configuration or operation of the player or in the way that it requests and receives streaming files, aside from configuring the player to request the initial streaming manifest from the helper. Changes to the existing workflow of the player also are not required though they are possible. In addition, the operation of the helper does not require any change to the CDN or its interaction with the playing device.

In some cases, the helper can be provided as code separate and distinct from the player and designed to interact with the player by a defined communication protocol (an API) that can include requests from the player to the helper for streaming files and delivery from the helper to the player of streaming files in response to the requests. In some examples, part or all of the helper can be incorporated into the player. In some instances, part or all of the player can be incorporated into the helper. All or part of the player can be incorporated into the operating system (e.g., operating system 19 of FIG. 1) of the playing device. Part or all of the helper can be implemented in a device that is separate and distinct from the playing device. For example, the helper could be implemented in a storage device that is local to the playing device, such as a storage device in a house. More generally, in a context in which a playing device is co-located (say in a house) or co-owned or co-used along with other devices that together use one or more common accounts for access to a communication channel, part or all of the helper could be located in one or more of the other devices. In some implementations, the helper could be split into parts that are installed and executed on the playing device and another cooperating device, with the two parts communicating with one another by a defined communication protocol. Additionally, the helper communicates with one or more applications installed on the same device or on another device on the network. Communication occurs via web protocols including, but not limited to, HTTP, FTP, UDP and standard advertising interfaces which may include VAST/VMAP/VPAID/SIMID or other current protocols.

The helper improves the delivery, value, quality, monetization, or other aspects (and combinations of them) of advertising delivered to the player, whether while presenting media items or in other ad presentations on the playing device (e.g., launch screens, content browsing, etc.). In particular, the helper can increase the value of the advertisements presented during the presentation of streaming media items. The helper may enhance the applicability of the advertisements to the viewer by providing additional and improved data, functions, and features associated with the presentation for ad decisions after the presentation of the streaming content begins. It can achieve this result, among other reasons, because it can create a manifest that enables ad decisions based on the additional and improved data, functions, and features associated with the presentation closer in time to presentation of the ads and can extend the time window during which advertising decisions would otherwise need to be made. In many uses of the technology, the helper provides its services to the player shortly before, during, or shortly after the player presents a media item. In some instances, the helper can provide its services long after the start of presentation of the media item.

In some implementations, the helper provides functions, features, and other services to the playing device, to the player running on the playing device, and to other applications and processes running on the device among other consumers. In some cases, we refer to the entities being served as "consumers". We also sometimes use the simple term "player" to refer more broadly to all kinds of "consumers". In some instances the helper could provide functions, features, and services to other devices and processes and applications running on other devices.

Core Functions of the Helper

In order to be able to provide its services, the helper performs the following core functions, among others:

1) It can intercept and rewrite a streaming media manifest before it is received by the player;

2) It can identify those URLs within the manifest that are advertising related based on metadata in the manifest or other predetermined or dynamic means that point to the ads and associated metadata ("original ads");

3) It can optionally pre-cache content segments and advertising segments that are intended to be played back by the playing device;

4) In some cases, it can independently, or in conjunction with a third party service, identify factors, via metadata analysis or content analysis/association that could drive a decision that the original ad is not of high value or otherwise is not ideal; for example, content analysis can identify factors based on an analysis of the content selected by a viewer; factors could include the presence or absence of an ad for a given slot, duplication of an ad in the same ad break ("pod"), the encoding quality of the ad, or the value of the ad relative to other ads;

5) It can interact with one or more of server side ad insertion platforms, or third party ad decisioning platforms, or an ad server to initiate the process of acquiring additional advertisements, either individually, in pods, or as a slate;

6) It can identify and optionally request and store a second set of one or more advertisements during the course of its providing service to the player while the media item is being presented ("second ads");

7) It can direct the player to video segments representing either one, the other, or a combination of original ads and second ads;

8) It can, in effect, extend the ad decisioning time window for the advertisement infrastructure such that the advertisement infrastructure can return better, higher value results;

9) It can change the order in which segments are played by the player such that a truncated ad pod is lengthened or a missing ad pod is inserted into the stream for playback;

10) It can accept one or more ads in response to an individual ad call and decide on which of those ads should be inserted into the stream.

Generally, the helper is inserted into an existing architecture for streaming content and ads between the player and the remainder of the network. Put another way, communications (e.g., requests, calls) transmitted to the player from an ad infrastructure are received by the helper, and the helper transmits the communications to the player. Similarly, communications to the ad infrastructure from the player are received by the helper, and the helper transmits the communications to the ad infrastructure. In some cases, the helper receives subsequent ads from the ad infrastructure and makes a decision on which ads to present to the viewer. For example, there is an ad pod that has a house ad, an ad from Company A and an ad from Company B in it where the helper is going to replace the house ad. The helper can require that the ad infrastructure return more than one eligible advertisement to replace the house ad. The ad infrastructure returns a Company A ad, a Company C ad and a Company D ad. The helper can make the determination that the Company C ad is the best fit because it is not duplicative or competitive with the two original advertisers in the pod, Company A and Company B.

In examples, the helper receives requests the player would traditionally make to the network. The helper then makes those requests to the network on the player's behalf and receives the manifest generated in response to those requests and alters it. In operation, the player receives the altered manifest from the helper in response to an end user requesting a video. The player initiates presentation of media items referenced in the altered manifest provided to it by the helper. When the player initiates presentation of the media items and makes its request for the manifest, the helper processes the manifest to determine 1) if one or more ads referenced in the manifest can be replaced; 2) if an ad pod is truncated, can it be lengthened by adding an ad to the ad pod; and 3) if there are missing ad pods. In response to this determination, the helper will rewrite some or all of the URLs in the manifest to such that the player requests the associated segments from the helper versus the network directly. Accordingly, the player receives an altered manifest that includes URLs selected by the helper. The helper then issues one or more subsequent requests for ads while presentation of the requested media items occurs according to the manifest provided by the helper. In this way, the helper can control the actual content presented to the player for each URL that the helper has rewritten. As such, when the helper determines that a new ad is appropriate to be delivered, it can redirect the player to the segment locations for that advertisement.

To manage the locations from which the player acquires content, the manifest doesn't have to be formally "rewritten" once the helper has provided its altered version of the manifest. The helper maintains knowledge of which URLs are for the content segments since content segments must be presented in any case and in the right order. Since some or all URLs in the altered manifest direct the player to get direction from the helper as to where to go for each segment the helper can now control what content ultimately plays on the device. Specifically, the helper can effectively rearrange, replace, or add or delete video segments that are presented to the viewer without updating the manifest again, and without the player being aware that the changes are being made after the altered manifest was delivered.

Accordingly, the helper can direct calls from the player to locations of its choosing, via URL redirects, HTTP 303 or other process. The helper functionality is triggered upon a request by the player for streaming content (for example a request for a movie based on input of a viewer). Streaming content can employ CSAI or SSAI to insert ads to be presented to a viewer. The helper according to the technology is operable in systems that include CSAI, SSAI, or any combination of them. For ease of description, the technology is generally described using an SSAI based system for VOD streaming. However, the helper can enable second look media presentation and other functions and features in CSAI, SSAI, and within live streaming and linear streaming and any combination of them.

Helper Implementation: VOD SSAI

Figure 2:
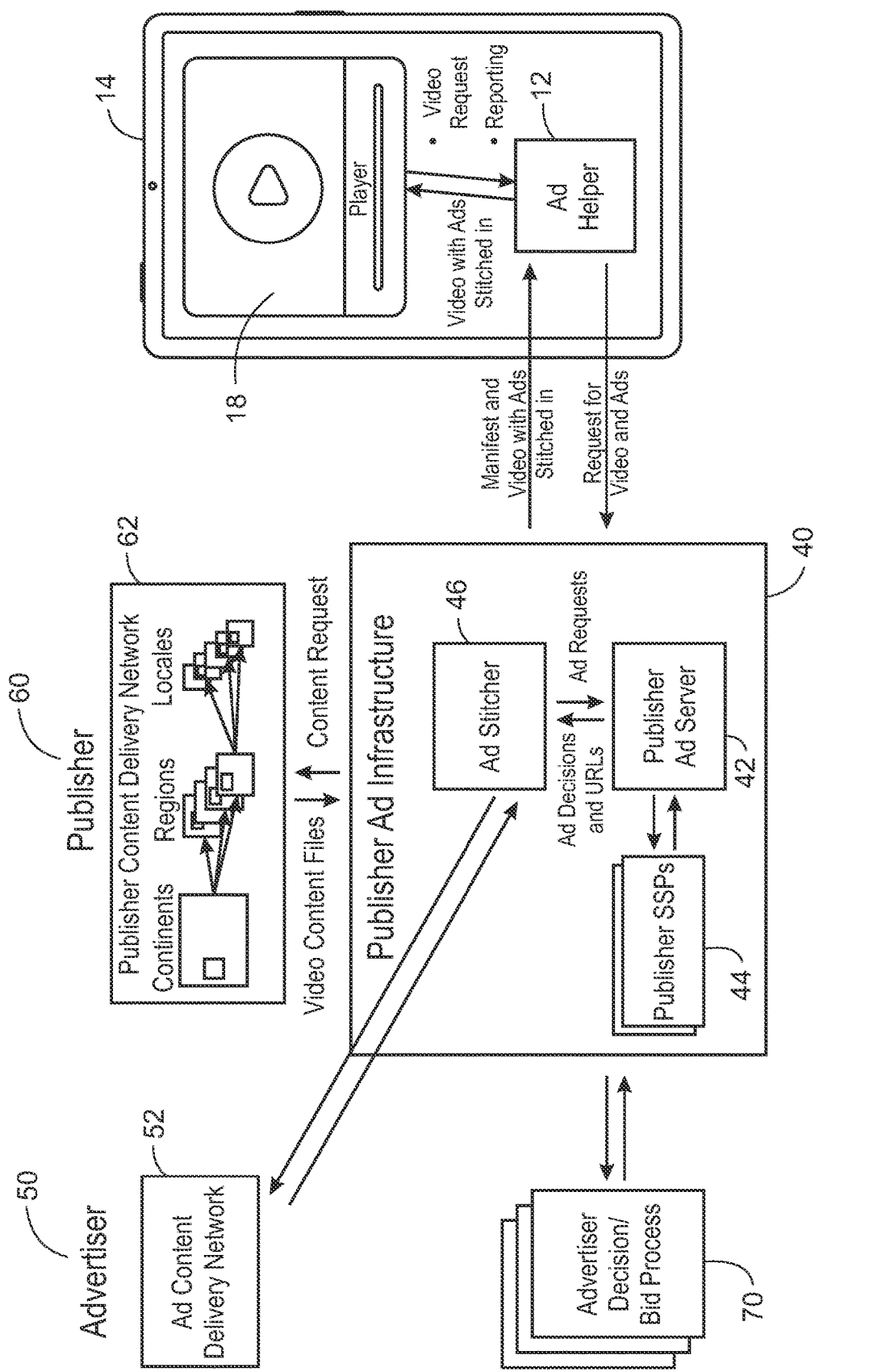
FIG. 2 is an illustration of an exemplary framework that enables server-side ad insertion with a helper.

FIG. 2 is an illustration of an exemplary framework 200 that enables SSAI with a helper. The framework includes a device 14, a playing device similar to the device described in FIG. 1, having a player 18 and a helper 12. In some examples, a viewer makes a request for content at the player 18. For example, a viewer can select from a library of content (media items) available from a publisher 60. In some cases, a viewer can select from a library of content available via a platform provider. This action triggers a manifest request for the media items from the player to the publisher/publisher's infrastructure, and an original manifest is generated that includes the selected media items and one or more ad pods. Presentation of media items referenced in the original manifest occurs at the player 18. We broadly use "manifest request" to refer to requests issued by the player and helper in response to the viewer's selection of content at the playing device 14. The manifest request includes a request for media items and a request for advertising items. Since the decisions on the advertisements to include in the manifest must be made within a very short time window and rely on auction mechanisms, creative delivery platforms, and varying network conditions, there are often problems such as duplicated ads, non-responsive ads, failed ad delivery, mismatched encoding and other issues that may cause an ad pod to be filled sub-optimally. These conditions can directly reduce revenue for ad-supported video publishers. Fundamentally, the existing ad architecture does not allow significant opportunity to use the time between when an ad was chosen and when it is physically shown to the viewer to improve the quality and value of the placement.

Recall that media items are typically embodied as a collection of small files, each file representing a brief segment in a sequence of segments that together make up the requested media item. The location of these files are typically identified in the manifest by URLs. The manifest that is received by the helper 12 can be altered by the helper to replace some or all existing URLs with new URLs. In this way, the helper creates an altered manifest that it passes back to the player. These new URLs can point to the helper so that when the player requests the video at these new URLs, the helper can choose where to direct the player. During presentation of the media items referenced in the altered manifest, the player 18 issues calls to locations referenced by the manifest. These calls are received by the helper 12.

Between the time of that event (starting the presentation of the media items) and an ad actually being presented by the player 18 on the playing device 14, a decision can be triggered by the helper 12 or by a component of the publisher's advertising infrastructure 40 to make one or more other request for additional ads (second or subsequent ads). The helper 12 either makes or is notified of this new decision. This decision can be based on predetermined or dynamic factors. The helper then initiates one or more requests for ads which may include ads to replace all the ads in the original manifest, only the ads in a particular ad pod, the ads in multiple ad pods, or just one or more ads independently. This request will be passed back to the publisher's ad server 42 or a third party advertising platform, platform vendor or other party either directly, or via the publisher's ad infrastructure 40 either via an ad stitcher 46 or other element of the ad infrastructure 40. In the example of FIG. 2, the publisher ad infrastructure 40 engages in processes that result in a selection, typically, but not always, by the publisher's ad server 42, of the specific advertisements that are to be included in the requested manifest. In response, the network components may return an updated manifest including both the content segments and new ad segments, a manifest including just ad segments for the entire ad slate including all newly constructed pods, a manifest for just ad segments for only the affected pods, or a manifest including just ad segments for only the new ads to be added to one or more pods. In some cases, the helper will acquire multiple ads—the original ad slate or ad pods or individual advertisements and a second ad slate or pods or individual advertisements. We use the term "original ad" to refer to one or more advertisements listed in the original manifest created in response to a selection of content at a playing device 14. During presentation of the media items, the helper will intercept and receive some or all of the calls for segments based on URLs in the altered manifest from the player. The helper will then route the calls to segments that may or may not represent the originally chosen advertisements (ad slate, ad pods, individual ads) and which may be either cached locally or returned from a remote server. As a result, the helper can replace an entire ad slate, only specific pods, specific ads in one or more pods, add new ads to a pod, or add an entirely new pod to the stream. In some examples, a decision to replace an ad is made via the ad infrastructure. In some examples, a decision to replace an ad is made by the helper. For example, the helper can make a final determination about what advertisements actually get delivered to the player after the ad infrastructure has made a determination as to what ads are eligible. This process of altering, replacing, or adding ads to a VOD stream is a clever and novel concept.

Referring again to FIG. 2, the publisher's ad server 42 is communicatively coupled with the publisher's supply side platforms (SSPs) 44. The publisher's SSPs 44 are an automated system that enables a publisher to maximize the value of the available ad placements. The publisher's SSPs 44 engage in an automated bidding process 70 to sell the available ad placements on behalf of the publisher 60. The bidding process 70 can include pre-negotiated structures with advertisers (e.g., advertiser 50 shown in FIG. 2 and FIG. 5), dynamic bid offers and other models that are transacted with demand side platforms (DSPs), ad exchanges, and marketers.

The publisher's ad server 42 is communicatively coupled with an ad stitcher 46. The publisher ad server 42 selects which ad or ads to present to the viewer, and then sends back the XML documents, typically VAST/VMAP/VPAID or similar, for the ad to the ad stitcher 46. Once the advertisements have been selected in response to the request for media items, the URLs for these advertisements are returned to the ad stitcher 46 on the network. In particular, the ad stitcher 46 downloads, encodes, segments, and "stitches" the ad segments and content segments into a manifest created in response to the request for media items. The ad stitcher 46 creates a manifest that points to the media items at the appropriate times and at the appropriate quality levels. In some examples, the stitching is done by inserting the advertising related URLs into the manifest at the appropriate ad insertion points. The manifest provides the location of all related content segments and any associated content, such as alternate audio, closed caption and subtitle text, and advertising segments. Accordingly, the publisher's ad stitcher 46 also makes a request for content from the publisher content delivery network (CDN) 62. Generally, the content corresponds to the content selected by the viewer. The publisher CDN 62 enables access to files based on continent, region and locales. The publisher CDN 62 transmits the video content files to the publisher ad stitcher 46 of the ad infrastructure 40. In some implementations, the helper 12 may make a call to the ad stitcher 46 requesting one or more ads for rapid use, while making an additional asynchronous call to replace or insert ads in an updated manifest at a later time. The ad stitcher 46 may also re-encode the ad to match the bitrate of the content segments received from the publisher CDN 62.

The completed manifest (content and advertising segments) is passed back to the player 18. The helper rewrites all or some of the URLs in the manifest and passes the manifest to the player 18, which uses the URLs in the manifest to issue calls for the content segments and ad segments in sequence for presentation in one continuous stream. Some or all of these URLs will direct the player 18 to the helper 12 and the helper 12 receives these calls and maps the calls to another location based on the new advertising responses received from the ad infrastructure. In some examples, the helper 12 may receive the call for an ad from the player 18 and make a decision to provide a pre-cached ad. The pre-cached ad can be sourced from a location on the same device as the player or a location on a device in the same local network as the player.

As part of its process, the helper may perform quality checks that include ensuring that ad metadata is received, the ad is received and encoded appropriately, there are no duplicate ads, and ensuring that the new ads conform to any business rules set by the publisher. In some cases, although new ads were identified by the helper 12, the original ads are presented in response to calls from the player 18. This may occur if there is an error or other issue in acquiring and inserting the new ads, or, if the original ads are determined to deliver a higher value result. Accordingly, in some cases the helper can make a final decision about what advertisements are presented by the player after the ad infrastructure has made a determination as to what ads are eligible for presentation in response to a second or subsequent ad request.

The helper can also obtain advertising tracking beacons and pass those beacons to the publisher ad infrastructure 40 as needed. Generally, advertising tracking beacons are indicators associated with viewer behavior. In some implementations the advertising tracking beacons are returned for reporting by the player. In other implementations the tracking beacons are called by an SSAI vendor in the network when the advertising is sent to the player. The helper may access any additional first and third party beacons that are typically unavailable to the publisher ad infrastructure 40. For example, first party beacons are generated by the helper directly from the viewer's device. These first party beacons can reflect and report on on-device behavior, such as if the viewer has minimized the player (and is thus not currently viewing the presented media items) or if the viewer is interacting with other applications on the device. The beacons may include, for example, ad viewability measurements (which may not be supported in SSAI). Ad viewability measurements can count the number of times an ad is viewed, also referred to as an ad view. In particular, the ad view is recorded using ad beaconing for events (e.g., ad start, quartiles, ad complete) that are generated (e.g., 'fired') from the server insertion system or from the player, or a combination of them, depending on the implementation.

Figure 3:
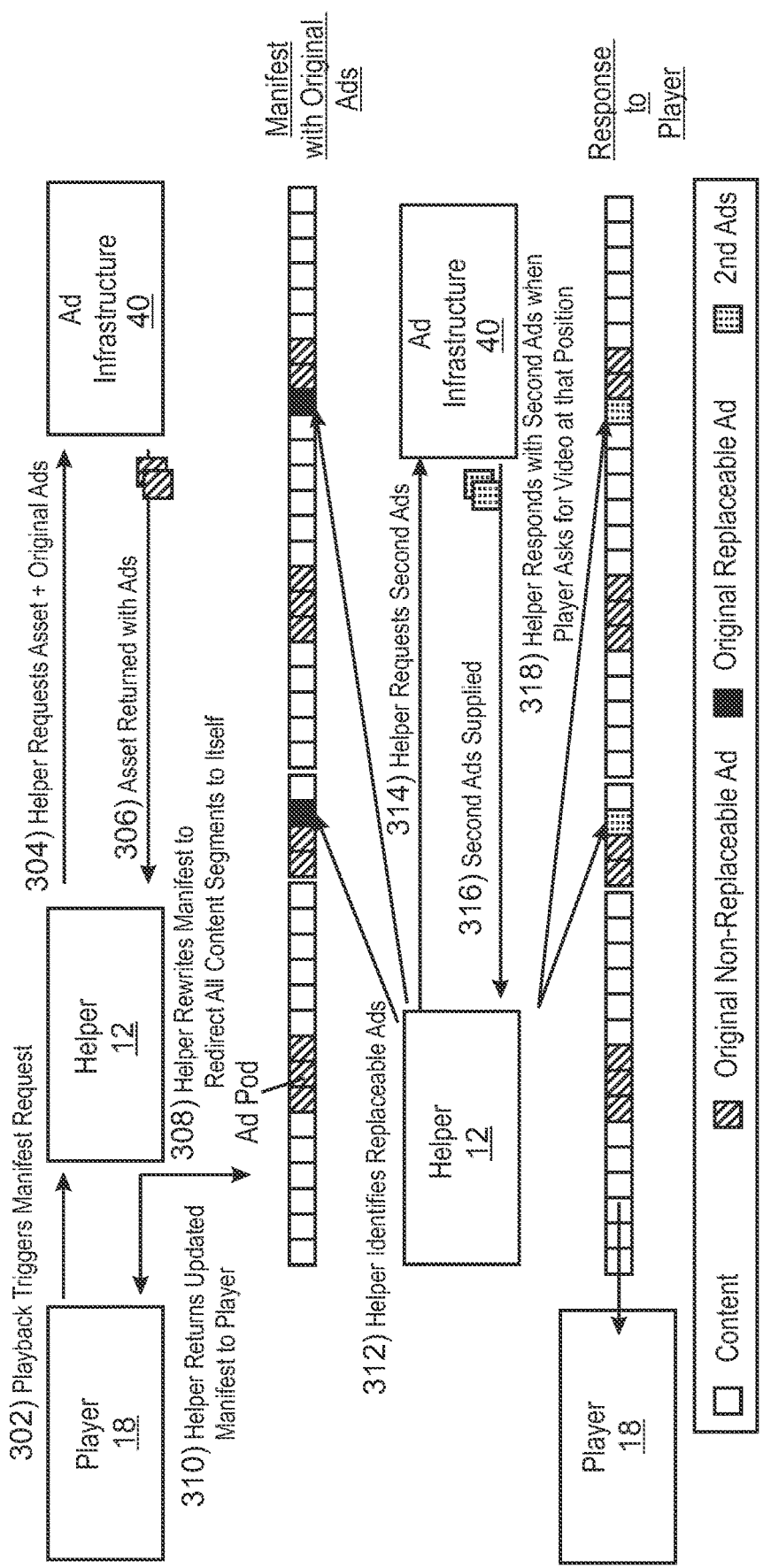
FIG. 3 is a block diagram of a system for replacing advertisements to be presented during presentation of media items via SSAI.

FIG. 3 is a block diagram of a system 300 for replacing advertisements to be presented during presentation of media items via SSAI. The system 300 is described using a series of steps. However, the technology should not be considered limited to the particular order or sequence of steps as described here. Moreover, for ease of description, segments are illustrated such that each ad corresponds to a segment and content corresponds to a plurality of segments. However, an ad may correspond to one or more segments. Moreover, the particular arrangement of ad segments and content segments is exemplary and should not be considered limiting. At reference number 302, a selection of content triggers a request for a manifest. Accordingly, the player 18 issues a manifest request via the helper that includes a request for media items and advertisements. In the example of FIG. 3, the media items have a predetermined duration, such as VOD content. The presentation of the media items is initiated by a viewer selecting content for viewing.

At reference number 304, the helper 12 requests an original manifest that points to the content selected by the viewer and advertisements from the ad infrastructure 40. At reference number 306, the ad infrastructure 40 returns an original manifest that includes one or more pointers to locations where the segments of the content and original ads are stored. For example, the pointers are URLs. In this example, the manifest is a list of URLs that reference various aspects of a streaming video, which may include sub-lists of other URLs (defining closed captions or alternate audio), video segments, audio segments, text segments, and other segments and combinations of them. The manifest may also have other metadata defining meaning for the URLs (indicating what they represent, specifically, to the player). In some examples, a manifest is a text file.

In VOD, the aggregate duration of the files that correspond to the URLs in the one or more manifests is fixed in duration. Indeed, a core assumption of VOD is providing the viewer with an indication of the duration or total running time of the selected content. Thus, the manifest associated with VOD content corresponds to a known total duration. In some examples, the duration is indicated in seconds, and each URL that represents a media segment (video, audio, or text, for example) has an associated duration as well. In some examples, a "target duration" of segments may be 6 seconds, but the actual segments will be slightly variant (6.03533 seconds, 5.345 seconds, etc.) depending on how the encoding sets things up.

At reference number 308, the helper rewrites the manifest to redirect some or all of the pointers in the manifest to itself. For example, the helper processes the original manifest to remove all of the original URLs and replace every single URL with a newly formatted URL that points to a "helper server" in an updated manifest. In some cases, this may be done directly by the helper, as the result of the player's request to it for the media item manifest. In other cases, the redirection may be implemented via a routing protocol, such as Apple's HLS Content Steering Proposal (https://mailarchive.ietf.org/arch/msg/hls-interest/ZePUZkNIj8W0LYM8kW_fJ5R3IsU/2/). The helper server may be another physical server, a server realized by processes on the playing device, a server realized by some external device on the network, or in a cloud. The helper server may be a virtual server. Thus, the helper is an agent that can utilize the time between when the player starts to present the viewer selected content (at which point the original advertising decisions have been made) and when an ad break occurs (at which point an ad is presented, that is, consumed) to initiate a second round (or additional rounds) of decisioning to secure additional advertisements (second ads), resulting in an increase in the overall monetization of the streamed content. In some cases, the helper makes a final decision on ads to be presented by the player.

At reference number 310, the helper delivers the altered manifest to the player. As all the URLs are now directed to the helper, the helper can decide what it will do with URLs that appear in the updated manifest, for example, whether it will process a request for an originally represented URL by returning the segment at that URL to the player, or will make another request to the ad infrastructure and as a result provide a different segment to the player (for example, a segment of a replacement ad). Thus, at reference number 312, the helper identifies replaceable ads. Generally, the identification of ads for replacement is based on one or more decisions.

Decision making can be based on one or more factors. For example, the helper can make decisions on ads subject to replacement based on advertising metadata, ad pricing information, or playing device metadata, or other factors, and combinations of them. Decision-making for traditional advertising when streaming VOD content is limited to a short constrained time window with ad decisions based on information available prior to the player's request for a media item. The helper makes one or more decisions regarding ads based on, at least in part, information available after the player initiates playback of the requested content.

In some examples, the helper makes decisions on ads subject to replacement based on advertising metadata. After the request for a media item is made, the helper intercepts the returned manifest and the associated advertising metadata as explained above. The metadata generally describes advertisement attributes of the advertisements referenced in the manifest. The metadata may describe placement criteria associated with each advertisement. The advertising metadata may also include timing information, size requirements, suitability ratings (e.g., ratings according to the Motion Picture Association), payment specifications, pricing information, and other factors, and combinations of them. The advertising metadata can also indicate other ad placement criteria such as a physical location of the presentation of an ad with respect to the content (e.g., presenting the ad over content) or a temporal location within the content item (e.g., a start time for an advertisement slot). Furthermore, the advertising metadata can indicate whether a particular ad is a house ad or some other type of unpaid advertisement.

In some examples where one or more ads are identified as a house ad or other unpaid advertisement, the number and position of those ads are determined and used to make requests for new ads. The request for new ads is scenario dependent. In some cases, the ad infrastructure may mandate that all ads are replaced using a new, updated manifest. In some examples, the helper can intercept an advertisement with a suitability rating such as rated "PG-13" when data available after playback begins indicates that the viewer is below 13 years of age. In this example, replaceable ads are identified based on a comparison of the suitability rating of an advertisement with characteristics of the viewer. In some examples where pricing information is included in the ad metadata, the helper can attempt to obtain higher value advertisements using the pricing metadata to make decisions. In this example, replaceable ads are identified based on a comparison of the potential revenue associated with a first advertisement and the potential revenue associated with a second advertisement. In some cases, a lower-priced ad can be replaced with a higher priced ad by returning to the SSAI vendor a price target that is used when it reruns the advertising fetching process. Given a longer time window for making advertisement decisions, the publisher's ad infrastructure may be able to rerun all requests for advertisements more than once. For example, the longer time window could be as short as two or three seconds. This may occur when an ad break is located at an early timestamp during the presentation of media items. The longer time window could be relatively longer, such as forty-five minutes. This may occur when an ad break is located at the end of the presentation of content, such as a television program.

In some examples, the helper makes one or more decisions regarding ads based on, at least in part, playing device metadata that includes geolocation information associated with the playing device. If the playing device is a mobile device and the geolocation changes from home to a coffee shop, that information might be valuable to an advertiser that is looking to target users that are in coffee shops in general or the specific brand of coffee shop where the device is currently be used. This may occur when presenting content with longer durations, such as a movie or if a user "pauses" the content stream and transits to a new location prior to resuming the stream. In this example, technical limitations can dictate that an ad slate only include ads up to an hour in the future. However, one or more subsequent rounds of ad calls initiated during the presentation can enable a more informed advertisement decision. For example, the change in geolocation from home to a coffee shop generates valuable playing device metadata that can be sent to the publisher ad infrastructure for a second ad decision. Geolocation data has a high degree of variability in value across advertisers. When the user was at home, one set of advertisers might value that location, when the user is at a coffee shop, a second set of advertisers might value that location. Accordingly, the technology enables other associated metadata that could be interesting to advertisers that weren't interested at the start of the presentation.

While particular decisions have been described to initiate a second request for advertisements, the helper generally recognizes poor or otherwise limited ad decisions and uses additional information to enhance a subsequent request for advertisements to obtain more relevant, higher value ads. At reference number 314, the helper requests updated ads. In addition to the subsequent request, the helper passes additional information to the ad infrastructure 40. The additional information may be, for example, the results of the decisions described above. For example, all or a portion of the advertising metadata can be transmitted to the ad infrastructure 40. At reference number 316, the ad infrastructure 40 identifies updated ads using additional information received from the helper 12. Generally, the ad infrastructure 40 engages in processes based on the additional information to select new ads that are to be included in the updated manifest.

At reference number 318, when subsequent advertisements are received, the helper can make an additional determination or decision on the advertisements that are presented by the player. For example, the helper responds with updated ads when the player requests segments that correspond to advertisements. In some cases, the helper receives a subsequent round of advertisements and makes a determination of which original ads in the original manifest are to be replaced by updated ads from the updated manifest.

Replacement of an ad causes the helper to modify an original predetermined ad within the ad pod. For example, a player may originally be instructed (by URLs in the original manifest) to access a first location to retrieve an advertisement. The technology can modify the URLs so that the player is subsequently instructed to visit a second location to retrieve an advertisement.

In this manner, the technology enables the replacement of ads in VOD content after the start of the presentation of media items. Accordingly, the technology creates a mechanism to generate, facilitate, and execute a second or subsequent request or set of requests to use the time between when an original ad is initially chosen and when an updated ad is selected to improve the ad decision. This can be of value to a publisher in a number of situations including using better targeting data than originally available to make a new ad call for a higher value ad, providing an ad in a vacant spot where an ad wasn't chosen or a house ad was going to run, or improving the encoding of a an ad.

Figure 4:
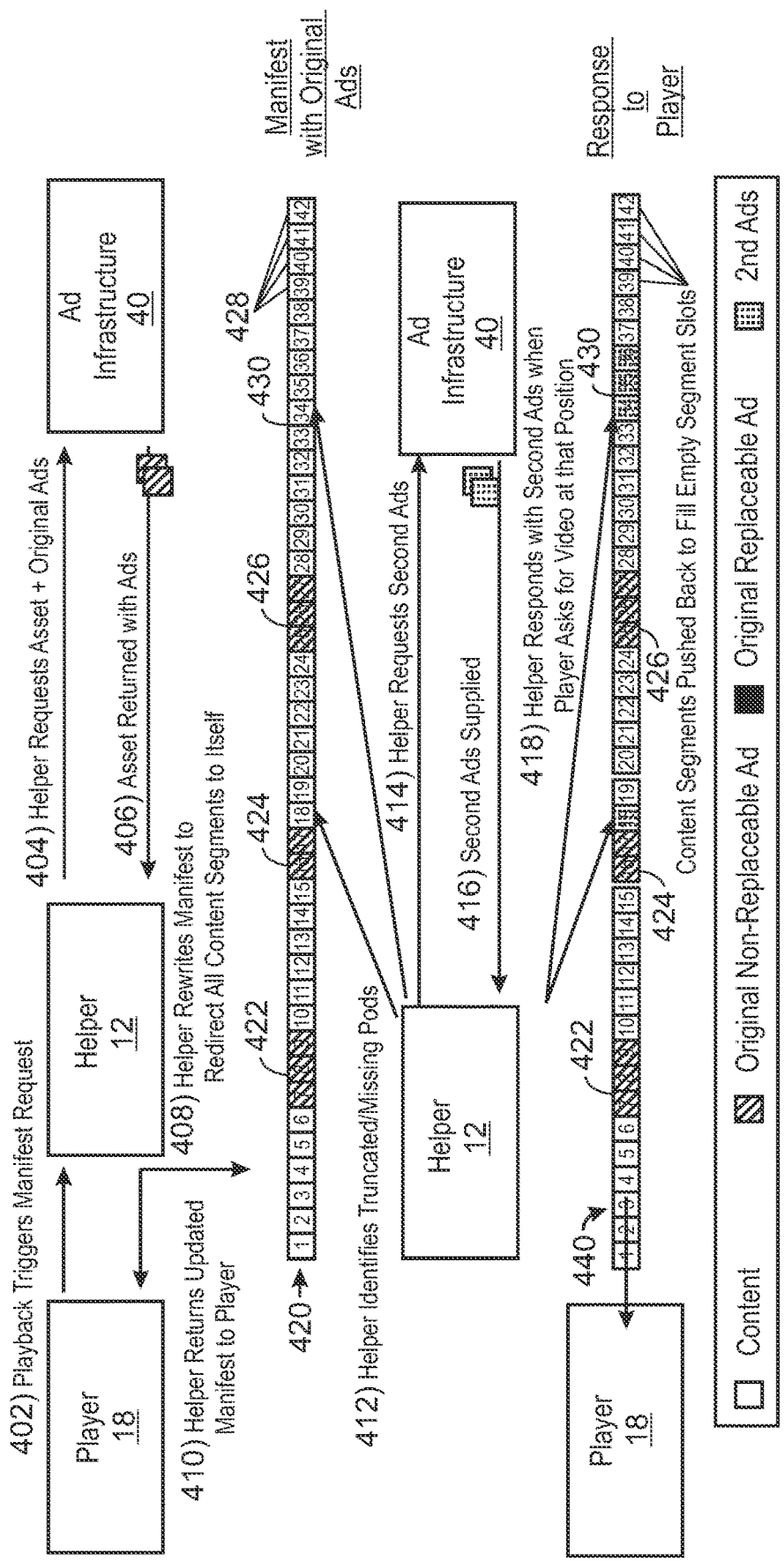
FIG. 4 is a block diagram of a system for inserting advertisements to replace missing advertisements to be included during presentation of media items.

FIG. 4 is a block diagram of a system 400 for inserting advertisements to replace missing advertisements to be included during presentation of media items. The system 400 is described using a series of steps. However, the technology should not be considered to be limited to the particular order or sequence of steps as described herein. Moreover, for ease of description, segments are illustrated such that each ad corresponds to a segment and content corresponds to a plurality of segments. However, an ad may correspond to one or more segments. Moreover, the particular arrangement of ad segments and content segments is exemplary and should not be considered limiting.

Similar to the block diagram 300 of FIG. 3, at reference number 402, a selection of content triggers a request for a manifest. At reference number 404, requests an original manifest that points to the content selected by the viewer and advertisements. At reference number 406, the ad infrastructure 40 returns an original manifest. At reference number 408, the helper rewrites the manifest to redirect some or all of the pointers in the manifest to itself. At reference number 410, the helper delivers the updated manifest to the player.

At reference number 412, the helper identifies truncated ad pods and missing ad pods. A truncated ad pod is identified based on a comparison of the number or duration (or both) of paid advertisements identified for an ad pod with a predetermined number or duration (or both) of paid advertisements for each ad pod. For example, the original manifest may include an ad pod with pointers to two paid advertisements, while the publisher has predetermined and indicated to the helper that the ad pod should include three paid advertisements. Accordingly, the ad pod has been truncated or is otherwise missing one or more ads within a pod.

The helper also identifies missing ad pods. A missing ad pod is identified based on a comparison of the number ad pods in an original manifest with a predetermined number of ad pods to be presented with the media items. For example, the publisher can pre-determine that the VOD content is to include three ad breaks at specific locations with three ad pods for the respective ad breaks including advertisements to be presented to a viewer. If the manifest does not reference three ad pods, then one or more ad pods are missing. The helper has now identified the missing ad pod and can insert an ad pod and the appropriate location.

To support the insertion of ads into a truncated ad pod or the insertion of a missing ad pod, empty segments are defined for the requested media items. In the example of FIG. 4, the stream 420 includes segments 1-6, 10-15, 18-24, and 28-38 that represent video content requested by the viewer. Segments 7-9 represent a first ad pod 422, segments 16 and 17 represent a second ad pod 424, and segments 25-27 represent a third ad pod 426 of the stream 420. The stream 420 also includes segments 39-42 that are empty segments 428. In the example of FIG. 4, the second ad pod 424 is a truncated ad pod that should include three segments. Further, in the example of FIG. 4, predetermined information from the publisher indicates that an ad break should occur after six segments of content. The helper identifies the missing ad break in the stream 420 at reference number 430.

Inserting replacement ads is desirable when an ad pod is truncated or missing. At reference number 414, the helper requests subsequent ads. In addition to the subsequent request, the helper passes additional information to the ad infrastructure 40. The additional information may be, for example, ad placement criteria for the truncated or missing ad pods. The ad infrastructure 40 can use this information to make a subsequent request for advertisements. At reference number 416, the ad infrastructure supplies second ads. A second or subsequent set of advertisements are obtained from the ad infrastructure 40. At reference number 418, when subsequent advertisements are received, the helper can make an additional determination or decision on the advertisements that are presented by the player. For example, the helper responds with subsequent ads when the player requests streaming data that corresponds to advertisements. Similar to the ad replacement described with respect to FIG. 3, the helper receives the subsequent round of advertisements and makes a determination of which ads in the original manifest are to be replaced. In this manner, the technology enables the replacement of truncated ad pods or missing ad pods in VOD.

In the example of FIG. 4, the stream 440 represents the stream 420 with truncated ad pods extended and missing ad pods inserted. As illustrated, the ad pod 424 of the stream 420 includes segment 18. This results in the ad pod 424 being a three segment ad pod. To insert an ad at segment 18, the content originally associated with segment 18 is pushed to segment 19. Generally, all subsequent segments are bumped to the next available segment when an ad is injected into a truncated ad pod. Similarly, the ad pod 430 is inserted into the stream 440. This creates an ad pod at a location in the streaming content where the ad pod was missing. The insertion of an ad within an ad pod or the insertion of a missing ad pod in the stream results in empty segments being filled with content. Accordingly, empty segments 428 from the stream 420 are filled with content as ads or ad pods are placed in the stream, as illustrated by stream 440.

Generally, during traditional SSAI the length of ad pods cannot be extended during playback. In particular, the traditional manifest that is received in response to a request for VOD content includes a predetermined, static start time and a static end time of the streaming segments. Thus, the VOD content is a fixed length. The helper described here enables an SSAI vendor to configure streaming media files of fixed duration with extra segments at the end of the stream. The segments available at the end of a stream can be moved as necessary. For example, the extra segments at the end of the stream can be moved forward, and replaced with paid advertisements. The remainder of the content would be pushed back to create space for the segments to get moved up. Accordingly, the technology enables steaming content as an adaptive asset based on, at least in part, advertising requirements.

The helper has been described thus far in the context of traditional SSAI, where the ads are interspersed in the manifest for the player and all ad decisions must be made prior to playback starting. From the player's perspective, no changes occur and the player makes requests for segments based on the original manifest. During most SSAI implementations (but not all) beacons are triggered from the SSAI server when the ad segments are requested by the player for playback, and not from the player itself.

Helper Implementation: Linear SSAI

In linear (which includes live streaming) SSAI, the ads are retrieved separately from the content segments and stitched into the sequence of segments upon subsequent updates of the manifest. Similar to VOD, the one or more manifests are received that have a predetermined or fixed duration. However, the number of these manifests is unknown and thus the duration or total running time of the content is unknown. In some cases, the manifests are received until an identifier is received that ends the stream of content and ads. As with VOD SSAI, in linear implementations, the beacons can be measured and fired by the player or the SSAI vendor. The ad segments may be presented at one or more ad markers in the sequence of segments. Traditionally, the SSAI vendor will make a call to other elements of the ad infrastructure at some point prior to each ad break. Often this process is initiated with enough time to make multiple, sequential calls to the ad infrastructure prior to establishing a finalized set of advertisements that will run in the upcoming ad break. The ad infrastructure returns a VAST/VMAP/VPAID or similar document that indicates URLs to VAST documents that represent the individual ads and metadata that defines those ads. As with VOD SSAI, the SSAI vendor will download, encode, and stitch those ads into the stream manifest that is being updated and refreshed by the player. Once the ads for a given ad break/ad pod are established, or at a predetermined cut-off period prior to the start of the ad break, the SSAI vendor views that ad break as being "completed" and no longer requests ads for said break. Given that the ad breaks are a predetermined and fixed time period, any unfilled ad placement will be displayed as a "blank" ad, often with language such as "ad break in process, please wait."

While there are fewer ad failures or other problems with ads in this process as a result of the SSAI making multiple calls for ads prior to the ad playback, problems still persist and opportunities are missed. In this scenario, the helper could be deployed to make a further round of calls, even after an ad pod and associated ads for the pod have begun playing. The process would work in the same way as described above looking to add/replace ads that are located after the initial ad in an ad pod. Again, this is a novel and clever approach that adds value beyond the current process.

In some examples, the publisher determines an opportunity exists to deliver a specific advertiser's ad when available space exists rather than showing the "please wait" screen. The ad could be stored on the playing device, on another device connected to the playing device, on a network device or in the cloud. The helper can identify these opportunities in the same manner that it identifies truncated ad pods (described above) and deliver the opportunistically targeted ad in place of the "please wait" screen.

In another example, the helper may be able to access additional targeting information that was not available at the time of the initial SSAI ad calls. This data may relate to the user, the geolocation of the device or the amount of time available for an additional ad. While making ad calls, the SSAI will typically provide a desired ad duration to the ad infrastructure when making a request for advertisements (e.g. 15, 30, 60 seconds). Often the mix of advertisers that respond do not completely fill a potential ad break and leave a remainder of time unfilled. Again since there is a time limitation on when the SSAI needs to complete the ad pod and send it to the player, the SSAI is unable to remedy this situation. The helper can utilize the time occurring when the ad pod begins playback to make additional requests to fill this remaining and unfilled ad space.

Helper Implementation: CSAI

In CSAI, the ad segments are retrieved separately from the content segments. The ad segments are presented using a second player (such as a second instance of the player 18 of FIG. 1). In some examples, the content segments and the original manifest exist unbroken and ad free, and the player presents the ad segments to the viewer in a second instance according to a predefined timeline. In CSAI, the advertising tracking beacons are measured and fired by the player. The ad segments may be presented at one or more one or more ad markers in the original manifest.

Traditionally, in CSAI the player will make a call to the publisher ad infrastructure early during the presentation of the content segments to request access to ad segments for presentation. The call may include parameters that define where the ad breaks are, or the ad breaks could be defined by defaults set in the ad server. The publisher ad infrastructure returns a VAST/VMAP/VPAID or similar document that indicates URLs to VAST documents that represent the individual ads and metadata that defines how those ads fill in the defined ad breaks. The player then calls the URLs to each of the ad VAST documents on its own timeline (either all together early, or as the defined ad break approaches) and uses the information about that individual ad to set up the second player with the ad segment and beacon accordingly.

Figure 5:
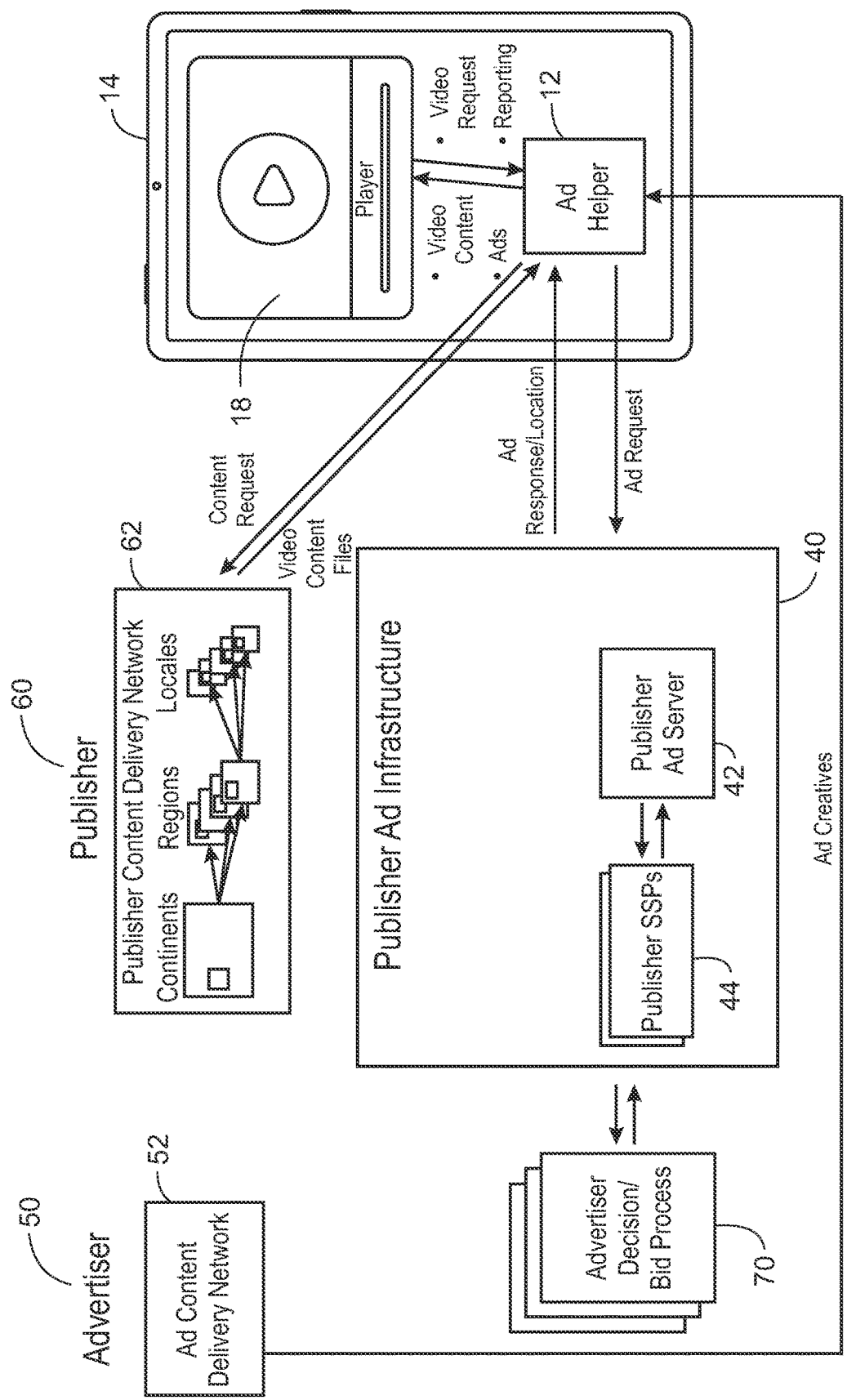
FIG. 5 is an illustration of an exemplary framework that enables CSAI with a helper.

FIG. 5 is an illustration of an exemplary framework 500 that enables CSAI with a helper. The helper enables subsequent ad decisions to be made after presentation of content segments is initiated in a CSAI-based system. The framework includes a device 14. The device 14 is a playing device. Similar to the device described in FIGS. 1 and 2, the device 14 includes a player 18 and a helper 12. A viewer selects content at the player 18. For example, a viewer can select from a library of content available from a publisher 60. In some cases, a viewer can select from a library of content available from a platform provider.

As illustrated, a request for content from the player 18 is transmitted to the helper 12 in response to a viewer selecting content at the device 14. The helper 12 makes a request for content from the publisher content delivery network (CDN) 62. The publisher CDN 62 enables access to files based on continent, region and locales. The publisher CDN 62 transmits the video content files to the helper 12. The helper 12 also sends a request for advertisements to the publisher ad infrastructure 40. In the example of FIG. 5, the publisher ad infrastructure 40 will engage in a number of processes that result in a decision, typically, but not always, by the publisher's ad server 42, selecting the specific advertisements that are to be returned to the helper 12. The publisher's ad server 42 is communicatively coupled with the publisher's SSPs 44 that engage in an automated bidding process 70 to purchase the available ad placements. In the example of FIG. 5, the CDN 52 can transmit ads to the helper 12.

Generally, in CSAI, the request for advertising and the request for content are separate. The manifest returned in response to the request for content is known and fixed, and the player makes a separate call to the ad server. In some examples, the player knows the intended ad breaks and uses the response from the publisher ad infrastructure 40 to fill the intended ad breaks. In some examples, the publisher ad infrastructure 40 returns an ad slate that includes metadata about the intended ad breaks. In this manner, the player knows (as it is consuming the content) it has an ad break coming up.

In a CSAI based system, an original round of ad requests is triggered via the helper 12 in response to presentation of the content segments. Calls are issued from the helper 12 directly to the publisher's ad server 42 with requests for one or more advertisements. The publisher's ad server 42 either looks internally to itself, or it looks externally for advertisements via the publisher SSPs 44 and the bid process 70. The publisher's ad server 42 makes one or more ad decisions to select ads for presentation and passes those ads to the helper 12.

Once presentation of the content segments begins and after the original round of ad requests are made, the helper can use advertising metadata to determine if subsequent ad requests are needed. Calls may be issued from the helper directly to the publisher's ad server with requests for one or more new advertisements. For example, the helper can evaluate the original ads, decide if there are any duplicated, missing, or low value ads, and initiate subsequent ad requests. As before, the publisher ad server 42 will identify updated ads to pass to the helper for presentation.

Communication Flow

Figure 6:
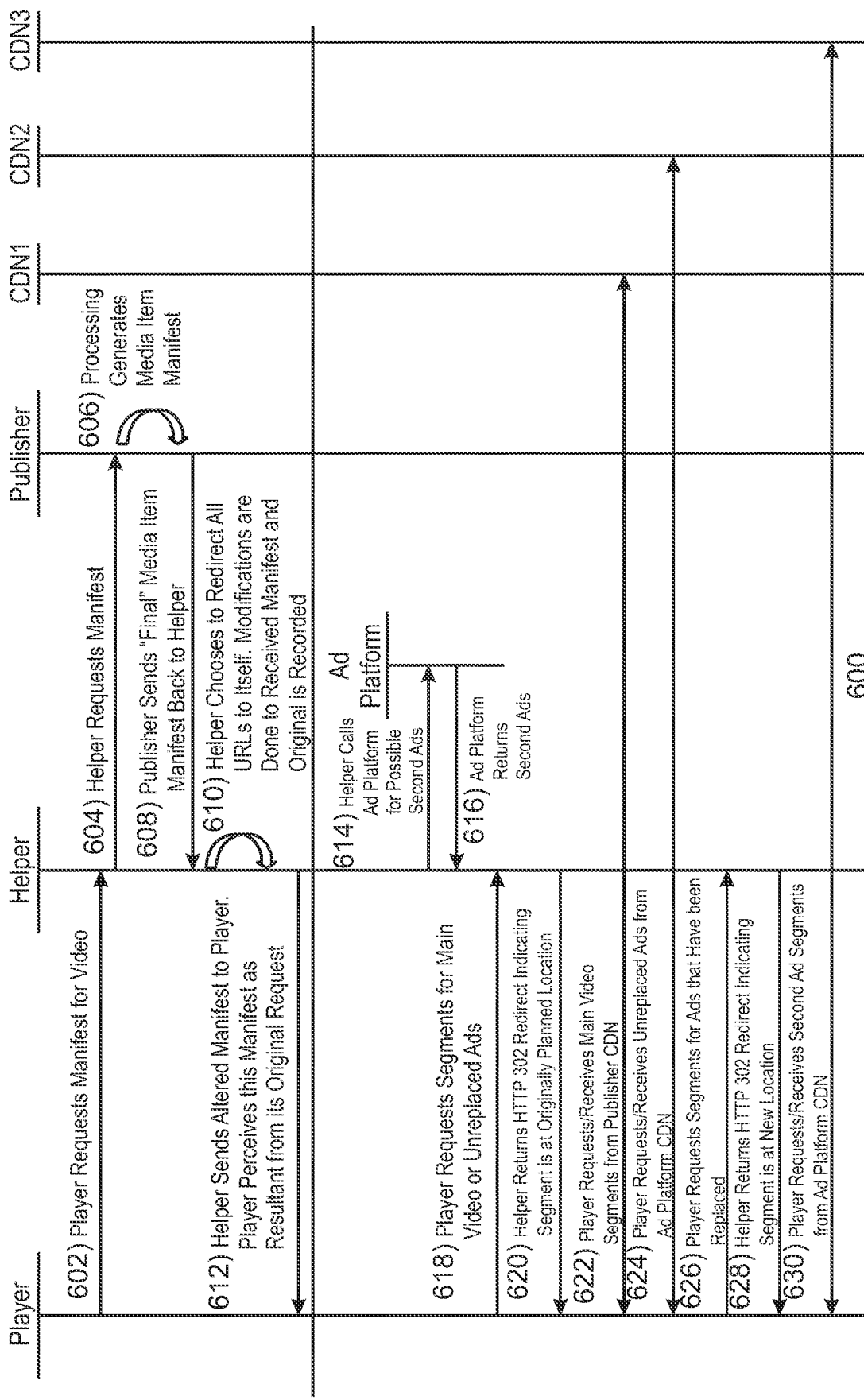
FIG. 6 is a diagram illustrating communication between the player, helper, publisher, and one or more CDNs.

FIG. 6 is a diagram illustrating communication between the player, helper, publisher, and one or more CDNs. For example, a first CDN is a publisher CDN. A second CDN is an ad platform CDN. A third CDN is another ad platform CDN. In some examples, the video content is obtained from whichever CDN the publisher uses. For example, first ads are likely obtained from whichever CDN the publisher server-side ad vendor uses. Second ads are most likely also from the same SSAI vendor, but could be different. Moreover, in the example of FIG. 6, the helper redirects some of the requests to itself, but establishes the original communication link (player to CDN) for others (the main video and original ads).

At reference number 602, the player requests manifest for video. At reference number 604, the helper requests the manifest. At reference number 606, processing generates the media item manifest. At reference number 608, the publisher sends a "final" media item manifest back to the helper. In this context, we mean "publisher" to be either the publisher or a 3rd party component on behalf of the publisher. At reference number 610, the helper chooses to redirect all URLs to itself. Modifications are done to the received manifest and the original is recorded. At reference number 612, the helper sends the altered manifest to the player. The player perceives the manifest as resultant from the request. At reference number 614, the helper calls the ad platform for possible second or subsequent ads. At reference number 616, the ad platform returns the second ads. At reference number 618, the player requests segments for main video or unreplaced ads. At reference number 620, the helper returns HTTP 302 redirect indicating the segment is at the original planned location. At reference number 622, the player requests/receives the main video segments from the publisher CDN. At reference number 624, the player requests/receives unreplaced ads from the ad publisher CDN. At reference number 626, the player requests segments for ads that have been replaced. At reference number 628, the helper returns HTTP 302 redirect indicating the segment is at a new location. At reference number 630, the player requests/receives second ad segments from the ad platform CDN.

FIG. 7 is another diagram illustrating communication between the player, helper, publisher, and one or more CDNs. For example, a first CDN is a publisher CDN. A second CDN is an ad platform CDN. A third CDN is another ad platform CDN. In the example of FIG. 7, the helper redirects all requests to itself (main video, original ads and 2nd ads).

At reference number 702, the player requests the manifest for a video. At reference number 704, the helper requests the manifest. At reference number 706, processing generates the media item manifest. At reference number 708, the publisher sends a "final" media item manifest back to the helper. At reference number 710, the helper chooses to redirect all URLs to itself. Modifications are done to the received manifest and the original is recorded. At reference number 712, the helper sends the altered manifest to the player. The player perceives the manifest as resultant from the request. At reference number 714, the helper calls the ad platform for possible second or subsequent ads. At reference number 716, the ad platform returns the second ads. At reference number 718, the player requests/receives subsequent ad segments from ad platform CDN. At reference number 720, the player requests segments for main video or unreplaced ads. At reference number 722, the helper requests/receives the main video segments from the publisher CDN. At reference number 724, the helper returns main video segments to the player. At reference number 726, the player requests unreplaced ads from the helper. At reference number 728, the helper requests/receives unreplaced ad segments from publisher CDN. At reference number 730, the returns unreplaced ad segments to the player. At reference number 732, the player requests segments for ads that have been replaced. At reference number 734, the helper returns pre-downloaded second or subsequent ad segments.

Other implementations are also within the scope of the following claims.

The invention claimed is:

1. A method comprising
receiving a request for a manifest;
forwarding the request to a server,
receiving the manifest, the manifest identifying a set of media segments;
obtaining an alternative URL corresponding to an alternative media segment and/or obtaining the alternative media segment;
receiving from a requestor a request for a first single one of said media segments identified in the manifest;
in response to the request for said first single media segment, providing to the requestor at least one of: (i) a redirect message comprising the alternative URL corresponding to the alternative media segment, wherein the redirect message is configured to trigger a receiver of the redirect message to use the alternative URL corresponding to the alternative media segment to retrieve the alternative media segment or (ii) a response message comprising the alternative media segment, wherein said alternative media segment is not identical to said requested first single media segment;
receiving from the requestor a request for a second single one of said media segments identified in the manifest; and
in response to the request for said second single media segment, providing to the requestor at least one of: (i) a redirect message comprising a URL corresponding to the first single media segment, wherein the redirect message is configured to trigger a receiver of the redirect message to use the URL corresponding to the first single media segment to retrieve the first single media segment or (ii) a response message comprising the first single media segment, wherein said first single media segment is not identical to said requested second single media segment.

2. The method of claim 1, wherein the method comprises providing to the requestor the redirect message comprising the alternative URL in response to the request for said single media segment.

3. The method of claim 1, wherein the method comprises providing to the requestor the response message comprising the alternative segment in response to the request for said single media segment.

4. The method of claim 1, further comprising:
modifying the manifest; and
providing the modified manifest to the requestor, wherein the modified manifest causes the requestor to send requests for the said segments to a helper.

5. The method of claim 1, wherein external components trigger a request to obtain one or more subsequent ads from the network.

6. The method of claim 1, wherein
the requestor is located on a device, and
requests from the requestor for segments of ads are handled by a helper process located on the device.

7. The method of claim 1, wherein
the requestor is located on a first device connected to a local network, and
requests from the requestor for segments of ads are handled by a helper process located on a second device connected to the local network.

8. The method of claim 1, wherein requests from the requestor are handled by a helper process located in the cloud.

9. The method of claim 1, wherein
the requestor is located on a device, and
ads are sourced from a location on the device.

10. The method of claim 1, wherein
the requestor is located on a first device connected to a local network, and
ads are sourced from a location on a second a device connected to the local network.

11. The method of claim 1, wherein ads are sourced from a location in the cloud.

12. The method of claim 1, wherein
the first single one of said media segments is a first particular content segment, and
the second single one of said media segments is a second particular content segment.

13. The method of claim 1, wherein the method is performed by a server-side ad insertion system.

14. The method of claim 1, wherein the method is performed by a client-side ad insertion system.

15. The method of claim 1, wherein the method is performed by a helper process.

16. The method of claim 1, wherein the manifest is for a video on demand video.

17. The method of claim 1, wherein the request for the manifest for the video is a request for linear content.

18. A method comprising:
receiving from a requestor a request for a single media segment of a media item comprising a plurality of media segments;
obtaining an alternative URL corresponding to an alternative media segment and/or obtaining the alternative media segment, wherein the alternative media segment is not identical to the requested first single media segment;
providing to the requestor a response to the request for said single media segment, wherein the response to the request for said single media segment is: (i) a redirect message comprising the alternative URL corresponding to the alternative media segment, wherein the redirect message is configured to trigger a receiver of the redirect message to use the alternative URL corresponding to the alternative media segment to retrieve the alternative media segment or (ii) a message comprising the alternative media segment but not comprising the requested media segment;
after receiving from the requestor the request for the single media segment, receiving from the requestor a request for a second single media segment of the media item, wherein the second media segment is not identical to the first requested single media segment; and
providing to the requestor a response to the request for said second single media segment, wherein the response to the request for said second single media segment is: (i) a redirect message comprising a URL corresponding to said first requested single media segment, wherein the redirect message is configured to trigger a receiver of the redirect message to use the URL corresponding to said first requested first single media segment to retrieve said first requested single media segment or (ii) a message comprising said first requested single media segment but not comprising the second single media segment.

19. The method of claim 18, wherein the response is the redirect message that comprises the URL corresponding to the alternative media segment.

20. The method of claim 18, wherein the response is the message comprising the alternative media segment.

21. The method of claim 18, further comprising:
after receiving the request for the second single media segment of the media item, receiving from the requestor a request for a third single media segment of the media item; and
providing to the requestor a response to the request for said third single media segment, wherein the response to the request for said third single media segment is: (i) a redirect message comprising a URL corresponding to said second requested single media segment, wherein the redirect message is configured to trigger a receiver of the redirect message to use the URL corresponding to said second requested single media segment to retrieve said second requested single media segment or (ii) a message comprising said second requested single media segment.

22. The method of claim 18, further comprising:
prior to receiving the request for the first requested single media segment, receiving a request for metadata for the media item; and
providing to the requestor the requested metadata, wherein
each representation of the media item consists of M segments, and
the metadata specifies that each representation of the media item consists of N segments, where N is greater than M.

* * * * *